Sept. 22, 1936.  A. C. ROUTH  2,054,835
ICE CREAM MANUFACTURE
Filed Oct. 12, 1933  4 Sheets-Sheet 3
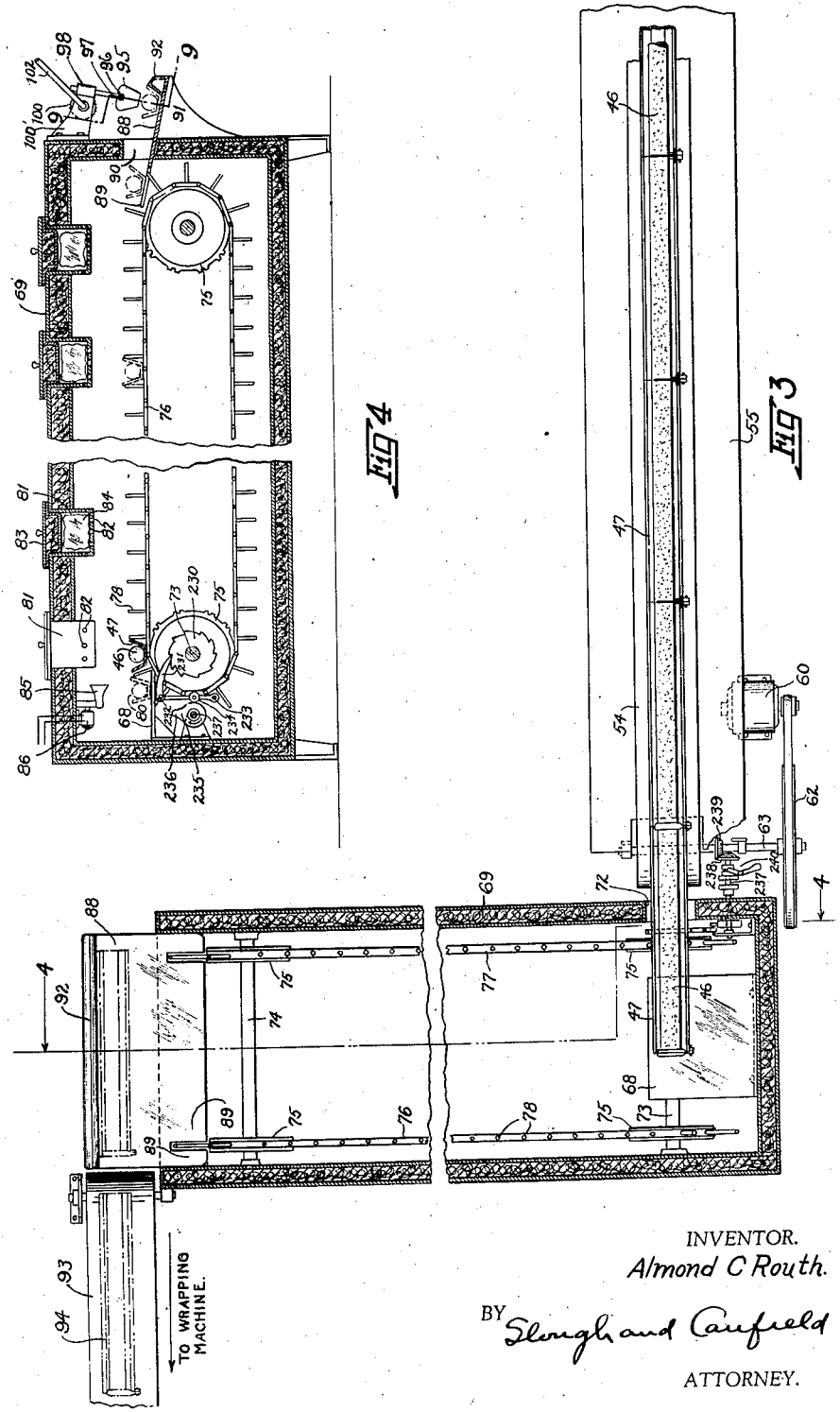
INVENTOR.
*Almond C Routh.*
BY Slough and Canfield
ATTORNEY.

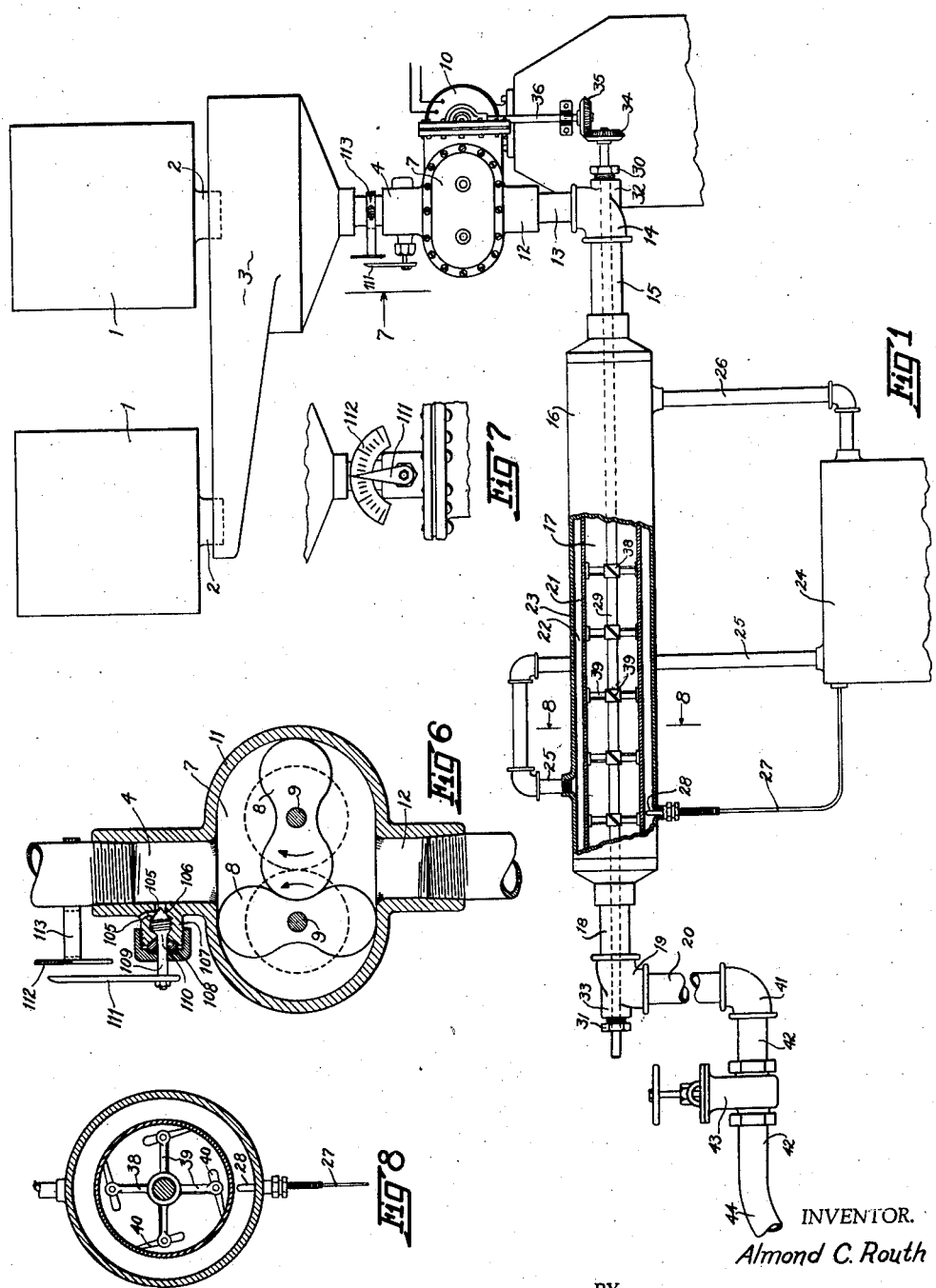

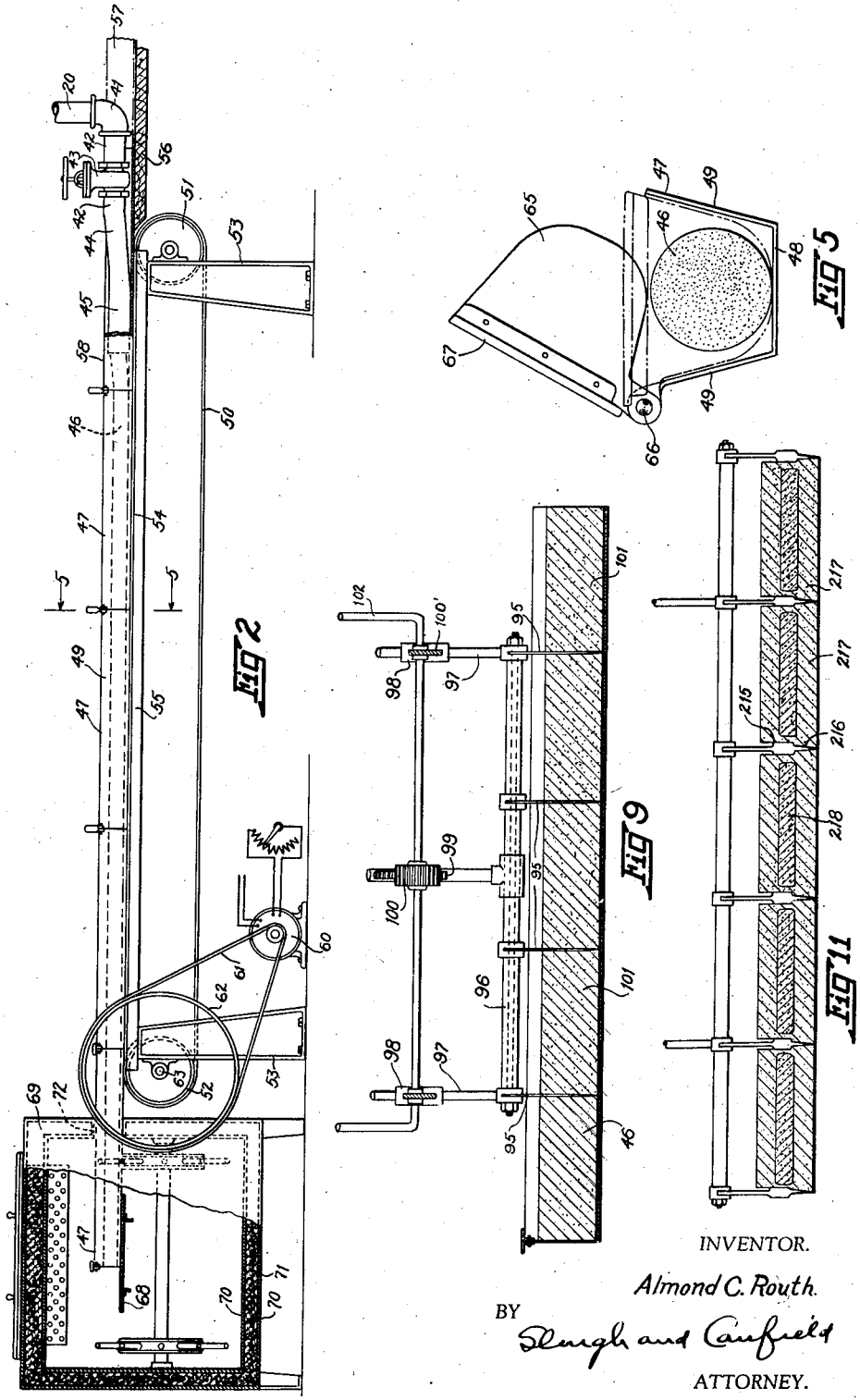

Sept. 22, 1936.   A. C. ROUTH   2,054,835
ICE CREAM MANUFACTURE
Filed Oct. 12, 1933   4 Sheets-Sheet 4
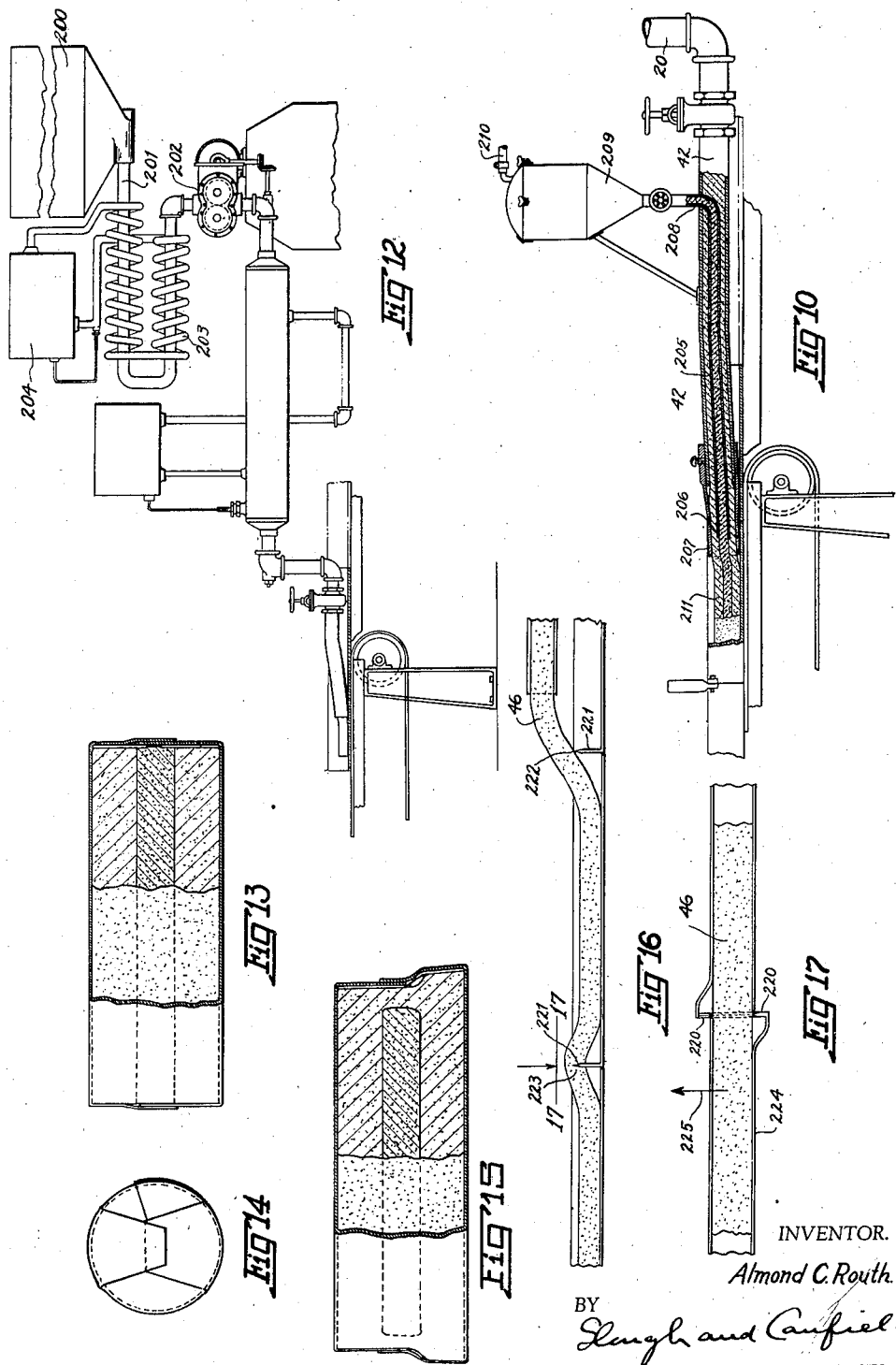
INVENTOR.
Almond C. Routh.
BY
Haugh and Canfield
ATTORNEY.

Patented Sept. 22, 1936

2,054,835

UNITED STATES PATENT OFFICE 2,054,835

ICE CREAM MANUFACTURE

Almond C. Routh, Sandusky, Ohio, assignor to Vogt Processes, Inc., Louisville, Ky., a corporation of Delaware Application October 12, 1933, Serial No. 693,307

22 Claims. (Cl. 62—114)

This invention relates to methods and apparatus for making formed portions of ice cream, ice cream confections and other articles and the like in quantities.

In the manufacture, distribution and sale of ice cream, the well known general method of delivering it at the point of sale, such as a soda fountain, in bulk, for example by the gallon in cans, and ladling it up to the consumer in small individual quantities or servings, has numerous disadvantages among which may be mentioned the irregularity in the amount served to each consumer and the consequent irregularity in the number of servings which can be made from each gallon delivered, a non-uniformity of the serving, and the unsanitary conditions attending the repeated dippings into the open can for individual servings.

It is an object of this invention to provide an improved method and means by which ice cream may be manufactured in small individual portions or servings and delivered in that form at the point of consumption.

Another object is to provide an improved method and means for manufacturing individual servings or portions of ice cream with a paper or like wrapper thereon.

Another object is to provide an improved method and means for manufacturing ice cream in relatively large unit pieces and for reducing the pieces to a number of saleable articles per unit piece, the number per piece being predeterminable but variable as desired in accordance with variations of price, quality, cost of manufacture, etc.

Another object is to provide an improved method and apparatus for converting plastic ice cream into relatively hard ice cream articles, confections and the like.

Another object is to provide an improved method and apparatus for manufacturing ice cream portions or pieces of unit size suitable to be cut up into saleable individual consumption size.

Another object is to provide, in an apparatus for making ice cream, an improved ice cream hardening apparatus.

Another object is to provide, in an ice cream extrusion apparatus, improved means for handling the extruded ice cream in the manufacture of articles, confections and the like therefrom.

Another object is to provide, in an ice cream making apparatus of the extrusion type, an improved means for successively hardening the ice cream to produce hard unit pieces suitable to be cut up into consumable individual sized confections or other articles.

Another object is to provide, in an ice cream making apparatus of the extrusion type, improved means for cutting the bar or rod of extruded ice cream into suitable unit lengths.

Another object is to provide, in an ice cream making apparatus, an improved method and means for incorporating air into the ice cream mixture and/or for controlling the proportion of air mixed with the ice cream.

Other objects will be apparent to those skilled in the art to which my invention appertains.

My invention is fully disclosed in the following description taken in connection with the accompanying drawings, in which:

Fig. 1 is a side elevational view partly in cross-section of an apparatus by which ice cream, in a relatively hardened state, may be extruded, and embodying my invention and by which the method of my invention may be practiced;

Fig. 2 is a side elevational view partly in cross-section of an apparatus whereby ice cream extruded from the apparatus illustrated in Fig. 1 may be cut into unit lengths, and conveyed to and through a hardening apparatus, and embodying my invention and whereby the method of my invention may be practiced;

Fig. 3 is a plan view partly in section of a part of the apparatus of Fig. 2;

Fig. 4 is a sectional view taken in the plane of the line 4—4 of Fig. 3;

Fig. 5 is a sectional view to an enlarged scale taken in the plane of the line 5—5 of Fig. 2;

Fig. 6 is a view to an enlarged scale illustrating in cross-section parts ilustrated in elevation in Fig. 1;

Fig. 7 is a fragmentary view to an enlarged scale taken from the plane 7 of Fig. 1;

Fig. 8 is a fragmentary cross-sectional view to an enlarged scale taken in the plane of the line 8—8 of Fig. 1;

Fig. 9 is a view to an enlarged scale taken in the plane of the line 9—9 of Fig. 4;

Fig. 10 is a view generally similar to a part of Fig. 2 but illustrating a modification;

Fig. 11 is a view similar to Fig. 9 but illustrating a modification which may be used in connection with the form of Fig. 10;

Fig. 12 is a view generally similar to Fig. 1 and to a part of Fig. 2 illustrating another modification;

Figs. 13 and 14 are, respectively, longitudinal sectional and end views of an ice cream confection which may be made by the practice of my invention;

Fig. 15 is a view similar to Fig. 13 illustrating a modification;

Fig. 16 is a fragmentary view similar to a part of Fig. 2 illustrating a modification of tray which I may employ;

Fig. 17 is a fragmentary view taken in the plane of the line 17—17 of Fig. 16.

In the preferred practice of my invention, an ice cream liquid mixture is first frozen to a temperature at which it will flow as a viscous plastic, and is then partially hardened and extruded from an extrusion nozzle, the hardening operation causing the extruded continuous bar to be form-sustaining. The bar is then severed into suitable shorter bars or lengths or articles and conducted to a hardening apparatus wherein the temperature is lowered sufficiently to cause the bars to become substantially solid rigid material after which they are severed into individual lengths of ice cream confections which are individually wrapped and then are ready to be delivered to the point of use or stored temporarily. If desired, the bar lengths after being hardened may be stored before being cut and wrapped.

The apparatus by which this process is here briefly described will now be described in detail.

Referring to the drawings, Fig. 1, I have shown at 1, 1 a pair of receptacles discharging, by spouts or mouths 2, 2 into a hopper 3. The receptacles 1, 1 are illustrated diagrammatically and represent ice cream freezing machines into which the liquid mixture may be poured and by which it may be frozen to the aforesaid plastic viscous consistency. Any known type and construction of ice cream freezing machine may be employed at 1, 1 for this purpose. If desired the machines 1, 1 may be disposed remotely from the hopper 3 and the ice cream discharged therefrom and transported to and discharged into the hopper 3, but preferably they are disposed so that when the ice cream has been frozen therein they may discharge directly into the hopper 3.

The hopper 3 converges at its lower portion and communicates with the intake conduit 4 (Figs. 1 and 6) of a pump 7. The pump 7 may be of any suitable or known construction but I prefer to employ a pump, as illustrated, of the double impeller type having a pair of involute or the like intermeshed impellers 8, 8 rotatably mounted on shafts 9, 9 and rotated by means of an electric or other motor 10 and enclosed in a pump housing 11. Such impeller pumps are well known and need not be further described herein, it being understood that they create a positive suction on the intake side, for example in the conduit 4, and create a positive pressure on the discharge side, for example in the conduit 12.

The conduits 4 and 12 are preferably vertically disposed in aligned relation, whereby the ice cream may flow from the hopper 3 by gravity toward the pump 7 and the discharge conduit 12 communicates with a conduit 13 which is connected by an elbow 14, to a substantially horizontal conduit 15 discharging into a hardening apparatus shown generally at 16.

The apparatus 16 has an interior elongated cylindrical chamber 17 into which the conduit 15 discharges and at the opposite end the chamber discharges into a similar conduit 18 generally axially disposed which is connected by an elbow 19 to a generally vertical conduit 20. The chamber 17 has a cylindrical relatively thin sheet metal wall 21 enclosed by an outer wall 23 spaced therefrom, to provide a refrigerant space 22.

At 24 is indicated diagrammatically a refrigerating apparatus adapted to circulate refrigerating medium, outwardly through a conduit 25 into the space 22, preferably at one end thereof, through the space and out by a conduit 26 back to the refrigerating apparatus 24. The refrigerating apparatus just described may be of any known or suitable construction and may be of the well known automatic regulating type adapted to deliver the refrigerating medium at a substantially constant temperature.

Such apparatus is well known wherein the regulation is effected by a tube and bulb containing thermally expansible and contractible liquid or gas. In the instant case, such a tube is shown at 27 and is connected to a bulb 28 which is inserted into the space 22 and into contact with the refrigerating medium therein. By this means, as is well known in the art, the refrigerating medium in the space 22 may be maintained at a substantially constant temperature which, in the practice of my invention, is sufficiently low to harden the ice cream in the chamber 17 to a predetermined temperature which will be more fully explained.

The plastic ice cream is caused to flow through the conduit 15, the chamber 17 and conduits 18 and 20 under the pressure of the pump 7 and while in the chamber 17 is continuously agitated by an agitating means comprising a rotatable shaft 29 extending axially through the chamber 17 and at opposite ends through the conduits 15 and 18 and their elbows 14 and 19 respectively. The ends of the shaft 29 are supported in bearing bores in threaded plugs 30 and 31 threaded into and sealed in suitable bosses 32 and 33 formed on the respective elbows to rotatably support the shaft 29. At the power input end of the shaft, and beyond its bearing in the plug 30, it is provided with a bevel gear 34 meshing with a corresponding bevel gear 35 mounted on a generally vertically disposed shaft 36, the upper end of which is connected to the motor 10 in any suitable manner to be rotatably driven thereby whereby power from the motor 10 may rotate the shaft 29.

Interiorly of the chamber 17, the shaft 29 is provided with a plurality of axially spaced beaters 38, each comprising, as shown in Figs. 1 and 8, a plurality such as four generally radially extending arms 39, each relatively thin and flat and twisted to function in the well known manner of a screw propeller; and the direction of rotation of the shaft 29 is such as to cause the ice cream in the chamber 17 to be propelled therethrough and at the same time agitated by the beaters 38. At the extreme outer ends of the arms 39 they are provided with pivoted scrapers 40 which scrape upon the inner cylindrical wall of the chamber 17 and remove therefrom ice cream tending to freeze thereupon and agitate it and mix it with the body of ice cream moving through the chamber 17.

By this means, the ice cream discharged into the conduit 20 is considerably harder than that discharged into the hopper 3. The conduit 20 is connected by an elbow 41 to a generally horizontal conduit 42 which may have a shut-off valve 43 therein. The conduit 42 beyond the valve 43 bends downwardly as at 44 and then substantially horizontally to provide a discharge spout or nozzle 45 from which may be continuously discharged a bar of relatively hard ice cream indicated generally at 46 (Figs. 2 and 3). Preferably, the low temperature which is given to the ice cream by passing it through the hardening apparatus 16, is sufficient to cause the bar to be form-sustaining. The cross-sectional form of the nozzle is preferably circular so that the bar is cylindrical, the shape of course being determined by the shape of the nozzle 45, but if desired it may be square, hexagonal or of any other form in cross-section.

The bar 46 of ice cream is discharged from the nozzle 45 into a continuous train of channel-shaped trays 47 having bottom and side walls 48 and 49, Fig. 5, and open at their ends. The trays are supported by their bottoms upon a traveling belt 50 looped over longitudinally spaced pulleys 51 and 52 rotatably mounted upon pedestal supports 53, 53. Between the pulleys 51 and 52 the upper reach 54 of the belt is supported upon a table 55. On the approach side of the pulley 51, a stationary table 56 is provided, the upper surface of which is in a plane with that of the table 55. The tables 55 and 56 may be supported on the pedestals 53 in any suitable manner.

The end of the nozzle 45 is spaced slightly above the belt reach 54. By this construction, a succession of trays may be fed onto the belt conveyor, Fig. 2, by pushing a tray 57, manually or otherwise, toward the left as viewed in that figure, into the position of the tray 58. The bar 46 is at that point discharged upon the tray and the tray is propelled by the belt reach 54. Successive trays are placed in the position of the tray 57, the trays moving along with their ends in abutment with each other and with a continuous bar of ice cream 46 lying therein. The belt reach 54 is preferably long enough to support a number such as three such filled trays, the succession of trays forming one continuous trough.

The belt is propelled by driving the pulley 52 and any suitable means may be employed to propel the belt at approximately the same longitudinal speed as the speed of the ice cream bar being extruded from the nozzle 45 to avoid stretching or buckling of the bar. One preferred means is a series electric motor 60 connected by a belt 61 to a relatively large pulley 62 on the shaft 63 of the pulley 52. (The pulley 62 is illustrated diagrammatically to avoid confusion of the parts lying behind it.)

A motor 60 is used, whose normal speed at the normal load will drive the belt at the proper speed, dragging the belt reach 54 along the table 55. If, for any reason, the bar 46 is discharged at a higher speed, this will tend to propel the trays and the belt reach 54, by the friction of engagement of the bar with the trays and of the trays with the belt reach, and correspondingly will reduce the load on the motor and it will speed up; and correspondingly, if the bar is discharged slightly more slowly, the increased load on the motor will cause it correspondingly to run slower. Thus, most of the load of the traveling belt is carried by the motor, and the motor will adjust its speed to the variations of speed of the ice cream bar without rupturing it or buckling it.

Each of the trays is provided with a cutter comprising a cutting blade 65 hinged as at 66 to one of the side walls 49 of the tray, to permit the blade to be moved downwardly into and upwardly out of the tray to sever the bar 46. The blade 65 has a handle 67 on the back edge thereof and spring means, not shown, may be employed to normally hold the blade in the elevated position, or in a counter-clockwise rotated position as viewed in Fig. 5, whereby the blade 65 will clear the conduit elbow 41 and the nozzle 45 when the tray is being moved longitudinally into position on the table 56 and belt 54.

At any suitable point in the travel of the tray on the belt, the blade may be depressed to cut the bar. The bar is thus cut into unit lengths corresponding to the length of the tray and while traveling on the belt 54.

When each tray, one after the other, reaches the end of the belt, the tray is propelled longitudinally, by succeeding trays, forwardly upon a table 68 supported in a hardening chamber shown generally at 69. The chamber is generally box form and has double spaced walls 70, 70 between which heat insulating material 71 may be packed, an aperture 72 being provided in a side wall of the chamber to admit the trays therethrough.

A pair of longitudinally spaced shafts 73 and 74 are mounted rotatably in the hardening chamber and each is provided with a pair of laterally spaced sprocket wheels 75, 75 upon longitudinally spaced pairs of which are toothed belts 76 and 77 having longitudinally spaced teeth or lugs 78 thereon. Adjacent teeth of the belts are spaced apart longitudinally to admit therebetween a tray 47 (see Fig. 4) and the lateral distance between the belts is so proportioned that opposite end portions of a tray may be supported on the two belts.

A forwardly moving tray containing a unit of the bar is propelled longitudinally, sliding across the table 68, and at the instant that the leading end has reached a predetermined position, the shaft 73 is quickly stepped ahead a predetermined distance by an indexing mechanism to be described, and the tray and its contents are carried laterally on the toothed belts and another pair of teeth is brought into position to receive the next succeeding tray and its contents. In this manner, a succession of loaded trays is transferred to the toothed belts disposed adjacent to each other and moved step by step longitudinally through the hardening chamber 69.

To step the toothed belts 76 and 77 as described, the following means may be provided. A ratchet wheel 230 is mounted on the shaft 73, Figs. 3 and 4. A ratchet pawl 231 is pivoted as at 232 upon the upper end of a lever, the lower end of which is pivoted as at 233 to a stationary point. A cam follower of the roller type, 234, is mounted on the lever at a point adjacent the pivot support 233. A cam 235 having a single lobe 236 is mounted upon a shaft 237. The shaft 237 is driven by a bevel gear 238 meshed with a bevel gear 239 on the shaft 63. A hand-operated clutch 240 may be provided to start or stop rotation of the shaft 237 in a well known manner.

The bevel gears 238 and 239 may be proportioned as to relative number of teeth so that upon rotation of the shaft 63 to effect projection of one tray into the hardening chamber 69, the shaft 273 may turn the cam 235 a revolution to effect notching ahead of the ratchet wheel 230 one notch and step ahead the toothed belts one tooth space.

The clutch device 240 permits the operator to synchronize the parts when starting up the apparatus so that notching ahead of the toothed belts will occur at exactly the proper moment to remove each tray in turn laterally from the line of the oncoming series of trays.

The hardening chamber 69 may be of any suitable longitudinal extent, and whatever its length, a relatively great quantity of ice cream in unit lengths for a relatively small volumetric capacity of the chamber is made possible and each unit piece may be subjected to hardening temperature of the chamber for a sufficient length of time while moving therethrough to harden it without requiring an excessively long chamber.

Any suitable means may be employed to chill the hardening chamber 69 to the desired hardening temperature. Refrigerating parts or other means conducting refrigerating medium into and out of the chamber may if desired be employed similar to that illustrated in Fig. 1 for the chilling chamber 17. Another form is illustrated in Fig. 4 comprising a plurality of containers 81 of sheet metal or the like projecting downwardly through the upper wall of the chamber and having perforations 82 in the walls thereof and heat insulating covers 83. Blocks of "dry ice" or solidified carbon dioxide 84 are placed in the containers. A fan 85, driven by an electric motor 86, acts to circulate the air in the chamber and cause the heat thereof to be absorbed by the carbon dioxide with resulting chilling.

When the trays and their contents have been carried entirely through the chamber step by step, they are deposited upon an inclined slideway 88 having a finger or fingers 89 disposed on opposite sides of the sprocket wheels 75 in the path of movement of the trays. Each tray pushes ahead the one in front of it and the trays move down the slideway 88 out of the chamber through a passageway 90 into engagement with a stop 92. Each tray with its ice cream bar may now be removed from the slideway 88 by shoving it longitudinally onto a traveling belt 93 leading to a wrapping machine or station where each unit may be wrapped in paper or like material before being stored in the cold room.

If preferred, the unit piece may be cut into short individual consumable lengths or articles or confections before going to the wrapping machine. Any suitable means may be employed to effect this cutting operation. In Figs. 4 and 9, one form is shown. It comprises a gang of cutting blades 95 mounted upon a head 96 which in turn is mounted for vertical reciprocatory movement by means of rods 97 secured to the head and movable longitudinally in bearings 98. A rack 99 is secured to the head 96 and meshes with a gear 100 rotatably supported on a bracket 100' on the chamber 69 and having connected thereto an operating handle 102. Upon depressing the handle 102, the rack will be propelled downwardly by the gear and will cause the blades 95 to cut the bar 46 into a plurality of pieces 101, preferably five in number and of equal length. The handle 102 may then be raised to remove the cutter blades to permit the tray and its multiple contents to be moved longitudinally onto the conveyor 93 for transportation to the wrapping machine where the individual articles or pieces may be wrapped.

In the manufacture of ice cream it is common practice to improve the consistency and palatability by incorporating therein a certain amount of air, the resulting increase in volume being known in the art as the "over-run". To suitably provide for over-run and to adjustably control it, I provide the means illustrated in Figs. 1, 6 and 7.

The conduit 4 on the approach or vacuum side of the pump 7 is provided with an air inlet duct 105 provided with a valve port 106 therein. A boss 107 is formed on the outside of the conduit 4 and therein is threaded a longitudinally movable valve 108 having a needle point controlling the valve port 106. The stem 109 of the needle valve is packed by a gland packing shown generally at 110 which may be of well known construction. Rigidly secured to the valve stem externally of the gland is a dial finger 111 which, upon rotating the needle valve, may be moved back and forth over a scale 112 secured to a strap 113 clamped upon the conduit 4 or upon the hopper 3 thereby supported adjacent to the dial finger 111.

Upon moving the dial over the scale 112 by rotation of the needle valve, the valve will open or close correspondingly the valve port 106, and change the effective size of the duct 105. The suction of the pump draws air through the duct and the pump thoroughly mixes it with the ice cream. Further incorporation and mixing of the air is effected by the agitation as above described occurring in the chamber 17. The amount of air admitted may, as will now be apparent, be accurately adjusted or varied as desired by movement of the dial finger 111.

The unfrozen ice cream mix in liquid form is delivered from the hopper 200 by the pump 202, and refrigerant from a refrigerating apparatus is circulated through coils 203 encircling the conduit 201 whereby the liquid in the conduit 201 is frozen to a plastic state.

In Fig. 10 I have illustrated another modification in which the ice cream bar is formed with a core of flavoring material. A tube 205 is disposed axially of the conduit 42 for a suitable distance with its discharge end 206 disposed adjacent to the end of the nozzle 207 and its opposite end 208 extending laterally through the wall of the conduit 42 and communicating with a reservoir 209. Flavoring or filling material in the reservoir 209 is subjected to pressure by air delivered through a supply conduit 210 and is forced into the tube 205. The ice cream in the conduit 42 flowing around the pipe 205 is thereby formed with an internal core and the flavoring material is forced into the core so that the bar 211 of extruded hardened form-sustaining ice cream is in the form of a hollow cylinder of ice cream filled with a flavoring material.

The nozzle 207 comprises a separate piece which may be adjusted axially on the end of the conduit 42 to adjust the relative positions of the ends of the nozzle 207 and the inner tube 205.

The method and apparatus just referred to for extruding a bar of ice cream cored with flavoring material form no essential part of the present invention but are claimed in my copending application Serial No. 671,176, filed May 15, 1933.

In Figs. 13 and 14 I have illustrated one of the pieces into which the bar unit above referred to may be cut, provided with a wrapper of paper or the like thereon and constituting an individual consumable article or confection. The confection is here shown of the cored form, but it will be understood, of course, that the uncored form such as one of the pieces 101, Fig. 9, may be wrapped and sold as a confection.

In Fig. 11 I have illustrated a modification of cutter which it may be preferred to employ when the cored form of bar is made. This cutter may be constructed and operated like the cutter of Fig. 9 except that the blade may comprise thickened shoulder portions 215 above the cutting portions 216 whereby, as the blade descends and cuts the bar into pieces 217, the shoulder 215 may mash the end of the casing or outer ice cream part and seal off the core portion 218 thereof. Thus liquid cores may be provided and concealed within the ice cream.

In Fig. 15 is illustrated one of the pieces 217 wrapped in paper or the like and constituting a salable confection for individual consumption.

Referring again to Fig. 3, when the tray which has just been delivered upon the table 68 is picked up and stepped ahead by the toothed belts 76 and 77, its rearward end is still in engagement with the next succeeding tray as described. A shearing movement thus occurs between the rearward end of the first tray and the forward end of the next succeeding tray. If desired, this movement may be employed to shear off the extruded bar without employing the individual cutter on the tray as above described. In this case, trays as shown in Figs. 16 and 17 are employed. On the forward end of the succeeding tray and the rearward end of the leading tray, opposite side walls are provided with cutting edges 220, and the forward end of the tray is provided transversely thereof with an upstanding cutting edge 221. When the bar 46 is extruded upon the line of trays, it descends at the point 222, Fig. 16, upon a cutting edge 221 and the weight of the bar will cause it to be at least partly severed as shown at 223. The bar will travel in this condition until the above described shearing operation occurs whereupon the cutting edges 220 will sever the bar at the adjacent ends of the tray. The tray illustrated at 224 (which is the one to be picked up on the hardening chamber conveyor) will be moved in the direction of the arrow 225 and the bar 46 will be sheared between the opposed edges 220.

The process above described may be operated continuously. In the form of Fig. 1, the hopper 3 may be continuously supplied with partly frozen ice cream from two or more batch freezing devices 1, 1; and in the form of Fig. 12, liquid mixture may continuously be supplied to the hopper 200. The hardening chamber 69 may be of suitable length in proportion to the rate at which the bar units are fed thereinto, so that each unit in passing once therethrough will be sufficiently hardened so that it may be handled in a wrapping machine as a solid article.

At no point in the operation is the ice cream or the articles made therefrom stopped so that a continuous stream of unit bars, or of individual pieces, may be discharged from the hardening chamber, or may be discharged wrapped from a wrapping machine not shown.

My invention is not limited to the exact details of construction shown and described. Many changes and modifications may be made therein within the scope of my invention, without departing from the spirit thereof or sacrificing its advantages.

The specific improvements in the cream freezing and delivering mechanism illustrated in Figs. 1, 6, 7, 8 and 12, are disclosed and claimed in my copending application Serial No. 53,782, filed December 10, 1935.

I claim:

1. In an apparatus for continuously making ice cream articles, an ice cream conduit, having a discharge extrusion nozzle, means for supplying ice cream to the conduit under pressure above atmospheric for forcing the ice cream through the conduit out of the extrusion nozzle, means for chilling a portion of the conduit and concurrently agitating the ice cream therein, to render the extruded ice cream plastic and form-sustaining, conveyor means for receiving ice cream extruded as a bar from the nozzle, means for cutting the extruded bar into unit lengths, and refrigerating means for hardening the unit lengths sufficiently to be handled as solids and wrapped in paper or like wrappers.

2. In an apparatus for continuously making ice cream articles, an ice cream conduit, means for forcing plastic ice cream through the conduit under pressure, said conduit having an extrusion nozzle, refrigerating means for chilling a portion of the conduit for reducing the ice cream to form-sustaining hardness, means for cutting the extruded ice cream bar into unit lengths, a chilling chamber, means for moving the lengths through the chamber to harden them and for discharging them from the chamber.

3. An apparatus as described in claim 2 and in which the ice cream is agitated in the chilled portion of the conduit while being forced therethrough.

4. In an apparatus for continuously making ice cream articles, an ice cream conduit, means for forcing plastic ice cream through said conduit under pressure, an extrusion nozzle at the discharge end of the conduit, refrigerating means for chilling a portion of the conduit to render the ice cream of form-sustaining hardness, conveyor means for receiving the extruded bar of ice cream, comprising a conveyor and a succession of removable trays thereon, means for cutting the extruded bar into unit lengths, one in each tray, while being conveyed from the nozzle, a refrigerated hardening chamber, means for moving the trays and contents into, through and out of the chamber to harden the unit lengths in the trays, and means for conveying the unit lengths in the trays to a wrapping machine.

5. In an apparatus for continuously making ice cream articles, an ice cream conduit, means for forcing ice cream therethrough under pressure, an extrusion nozzle at the discharge end of the conduit, refrigerating means for chilling a portion of the conduit to render the ice cream of form-sustaining hardness, conveyor means for receiving the extruded bar of ice cream, comprising a conveyor and a succession of removable trays thereon, means for cutting the extruded bar into unit lengths, one in each tray, while being conveyed from the nozzle, a refrigerated hardening chamber, means for moving the trays and contents into, through and out of the chamber to harden the unit lengths in the trays, means for cutting the unit lengths into article pieces and means for conveying the pieces to a wrapping machine.

6. In an apparatus for continuously making ice cream articles, an ice cream conduit, means for forcing ice cream therethrough under pressure, an extrusion nozzle at the discharge end of the conduit, refrigerating means for chilling a portion of the conduit to render the ice cream of form-sustaining hardness, conveyor means for receiving the extruded bar of ice cream, comprising a conveyor and a succession of removable trays thereon, means for cutting the extruded bar into unit lengths, one in each tray, while being conveyed from the nozzle, a refrigerated hardening chamber, means for moving the trays and contents into, through and out of the chamber to harden the unit lengths in the trays, means for cutting the unit lengths while in the trays into article pieces, and means for conveying the pieces to a wrapping machine.

7. The method of making ice cream articles which includes continuously extruding plastic ice cream into a bar while continuously chilling and agitating the plastic ice cream to render the bar of form-sustaining hardness, cutting the bar into unit lengths, further chilling the unit lengths to further harden them and conveying the hardened unit lengths to a wrapping machine.

8. The method of making ice cream articles which includes continuously extruding plastic ice cream into a bar while continuously chilling and agitating the plastic ice cream to render the bar of form-sustaining hardness, cutting the bar into unit lengths, subjecting the unit lengths to a low temperature to further harden them while continuously moving the unit lengths, and conveying the hardened unit lengths to a wrapping machine.

9. In an apparatus for continuously making ice cream articles, an ice cream conduit, means for forcing plastic ice cream therethrough under pressure, an extrusion nozzle at the discharge end of the conduit, refrigerating means for chilling a portion of the conduit to render the ice cream of form-sustaining hardness, conveyor means for receiving the extruded bar of ice cream, comprising a conveyor and a succession of removal trays thereon, means for cutting the extruded bar into unit lengths, one in each tray, while being conveyed from the nozzle, a refrigerated hardening chamber, means for moving the trays and contents into, through and out of the chamber to harden the unit lengths in the trays.

10. In an apparatus for continuously making ice cream articles, an ice cream conduit, means for forcing plastic ice cream therethrough under pressure, an extrusion nozzle at the discharge end of the conduit, refrigerating means for chilling a portion of the conduit to render the extruded bar of ice cream of form-sustaining hardness, a succession of removable trays onto which the extruded bar is delivered, means for cutting the extruded bar into unit lengths, one in each tray, while being conveyed from the nozzle, a refrigerated hardening chamber, means for moving the trays and contents into, through and out of the chamber to harden the unit lengths in the trays, and means for cutting the unit lengths into article pieces in the trays.

11. In an apparatus for continuously making ice cream articles, means for making plastic ice cream and extruding it in the form of a bar of form-sustaining hardness, conveyor means comprising a succession of moving trays into which the bar is extruded, each tray having an end wall over which the bar extends, and which aids in subdividing the bar into unit lengths, one in each tray, refrigerating means for hardening the unit lengths in the trays to render them of sufficient hardness to be removed from the trays as solids for purposes of wrapping.

12. In an apparatus for continuously making ice cream articles, means for making plastic ice cream and extruding it in the form of a bar of form-sustaining hardness, conveyor means comprising a series of longitudinally moving elongated trays into which the bar is extruded a unit length in each tray, refrigerating means for hardening the unit lengths in the trays and means for moving the unit lengths while being hardened.

13. In an apparatus for continuously making ice cream articles, means for making ice cream of form-sustaining hardness and discharging it from an extrusion nozzle in the form of a bar, conveying means comprising a series of moving trays into which the bar is extruded, a unit length in each tray, refrigerating means for hardening the ice cream while in the trays to render it of hardness sufficient to be handled as a solid and means for cutting the unit length into pieces while in the trays.

14. In an apparatus for continuously making ice cream articles, means for making plastic ice cream and extruding it in the form of a bar of form-sustaining hardness from an extrusion nozzle, a refrigerating chamber, conveyor means comprising a series of moving trays into which the extruded bar is deposited, each tray having an end wall over which the bar extends and which aids in subdividing the bar into unit lengths, one in each tray, and comprising means for carrying the trays with the unit lengths therein into the refrigerating chamber.

15. In an apparatus for continuously making ice cream articles, means for making ice cream and discharging it from an extrusion nozzle in the form of a bar of form-sustaining hardness, a refrigerating chamber, conveyor means comprising a succession of moving trays into which the extruded bar is deposited, a unit length in each tray, and for conveying the trays into the refrigerating chamber, means for cutting the unit lengths into pieces while in said trays.

16. In an apparatus for continuously making ice cream articles, means for making plastic ice cream and discharging it from an extrusion nozzle in the form of a bar of form-sustaining hardness, a refrigerating chamber, conveyor means comprising a succession of moving trays into which the extruded bar is deposited, a unit length in each tray, and comprising means for conveying the trays endwise into the hardening chamber, and means in the hardening chamber for conveying the trays laterally during the hardening of the unit lengths to render them capable of being handled as solids.

17. In an apparatus for continuously making comestible articles, means for extruding plastic comestible material and a flavoring material in the form of a bar of form-sustaining hardness, the flavoring material forming a core, conveyor means comprising a succession of moving trays into which the extruded bar is deposited, a unit length in each tray, and refrigerating means for hardening the unit lengths in the trays to render them of sufficient hardness to be removed from the trays as solids for subsequent wrapping purposes.

18. In an apparatus for continuously making comestible articles, means for discharging plastic comestible material from an extrusion nozzle in the form of a bar of form-sustaining hardness, conveying means comprising a series of moving trays into which the bar is extruded, a unit length in each tray, refrigerating means for hardening the material while in the trays to render it of hardness sufficient to be handled as a solid, and means for cutting the unit lengths into pieces after being hardened and while in said trays.

19. In an apparatus for continuously making comestible articles, means for extruding comestible plastic material from an extrusion nozzle in the form of a bar of form-sustaining hardness, a refrigerating chamber, conveyor means comprising a succession of moving trays into which the extruded bar is directly deposited, means for conveying the trays endwise into the refrigerating chamber, and means for moving each tray laterally whereby the walls of the trays shear the bar into unit lengths, the refrigerating chamber adapted to harden the unit lengths sufficiently to render them capable of being handled as solids.

20. In an apparatus for continuously making comestible articles, means for extruding comestible plastic material in the form of a bar of form-sustaining hardness, conveyor means comprising a succession of moving trays into which the bar is extruded, a unit length in each tray, and means for cutting the unit lengths into pieces while in the trays.

21. An apparatus for making individual service portions of frozen comestibles, including means for extruding the comestible in plastic form as a bar of form-sustaining hardness, conveyor means comprising a series of trays movable endwise in succession beneath said extruding means and upon which said bar is deposited, and a cutter pivotally connected to each tray for subdividing the bar into unit lengths, one in each tray.

22. An apparatus for making individual service portions of frozen comestibles, including means for extruding the comestible in plastic form as a bar of form-sustaining hardness, conveyor means comprising a series of trays movable endwise in succession beneath said extruding means and upon which said bar is deposited, a unit length in each tray, a plurality of cutters, and means for reciprocating them into and out of each tray in succession to subdivide the unit lengths into individual portions.

ALMOND C. ROUTH.